(12) United States Patent
Rosenberg et al.

(10) Patent No.: US 8,472,761 B2
(45) Date of Patent: Jun. 25, 2013

(54) WAVEGUIDE SYSTEMS AND METHODS

(75) Inventors: Paul Kessler Rosenberg, Sunnyvale, CA (US); Michael Renne Ty Tan, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 612 days.

(21) Appl. No.: 12/628,028

(22) Filed: Nov. 30, 2009

(65) Prior Publication Data

US 2011/0129184 A1 Jun. 2, 2011

(51) Int. Cl.
*G02B 6/00* (2006.01)
*G02B 6/10* (2006.01)
*G02B 6/28* (2006.01)
*G02B 6/32* (2006.01)

(52) U.S. Cl.
USPC ............... 385/24; 385/33; 385/132; 362/551

(58) Field of Classification Search
USPC ................................ 385/24, 33, 132; 362/551
See application file for complete search history.

(56) References Cited

U.S. PATENT DOCUMENTS

| | | | |
|---|---|---|---|
| 4,763,398 A | 8/1988 | Huizing et al. | |
| 5,729,646 A | 3/1998 | Miyagi et al. | |
| 6,895,164 B2 | 5/2005 | Saccomano | |
| 7,477,809 B1 * | 1/2009 | Tan et al. | 385/14 |
| 7,639,907 B2 * | 12/2009 | Elberbaum | 385/24 |
| 2007/0122097 A1 | 5/2007 | Schmidt et al. | |
| 2009/0034906 A1 | 2/2009 | Tan et al. | |

OTHER PUBLICATIONS

Sagi Mathai, U.S. Appl. No. 12/263,384, filed Oct. 31, 2008, "System and Method for an In-Plane Hollow core waveguide Optical Power Beam Sputter".
Michael Tan, PCT/US2009/030666, filed Jan. 9, 2009, "Systems and Methods for Routing Optical Signals".
Paul Rosenberg, PCT/US2008/082143, filed Oct. 31, 2008, "Device for Optically Coupling Photonic Elements".
Michael Tan, PCT/US2008/012351, filed Oct. 31, 2008, "Optical Broadcast Busses with Shared Optical Interfaces".
Jong-Souk Yeo, PCT/US2008/063283, filed May 9, 2008, "Methods for Fabrication of Large Core Hollow core waveguides".
Paul Rosenberg, PCT/US2008/058769, filed Mar. 28, 2008, "Flexible Optical Interconnect".

* cited by examiner

*Primary Examiner* — Ryan Lepisto
*Assistant Examiner* — Jerry Blevins

(57) ABSTRACT

A waveguide apparatus is provided. The apparatus can include a base member including a first surface having at least one first attachment feature and a waveguide member including a first surface and a second surface. The waveguide member first surface is complimentary to and disposed proximate the base first surface. The waveguide member second surface can include at least one channel. The apparatus can further include a cover member, comprising a plurality of second attachment features adapted to engage at least a portion of the at least one first attachment features disposed thereabout. At least a portion of the cover member can be disposed proximate the at least one channel, to provide at least one hollow core waveguide.

15 Claims, 5 Drawing Sheets

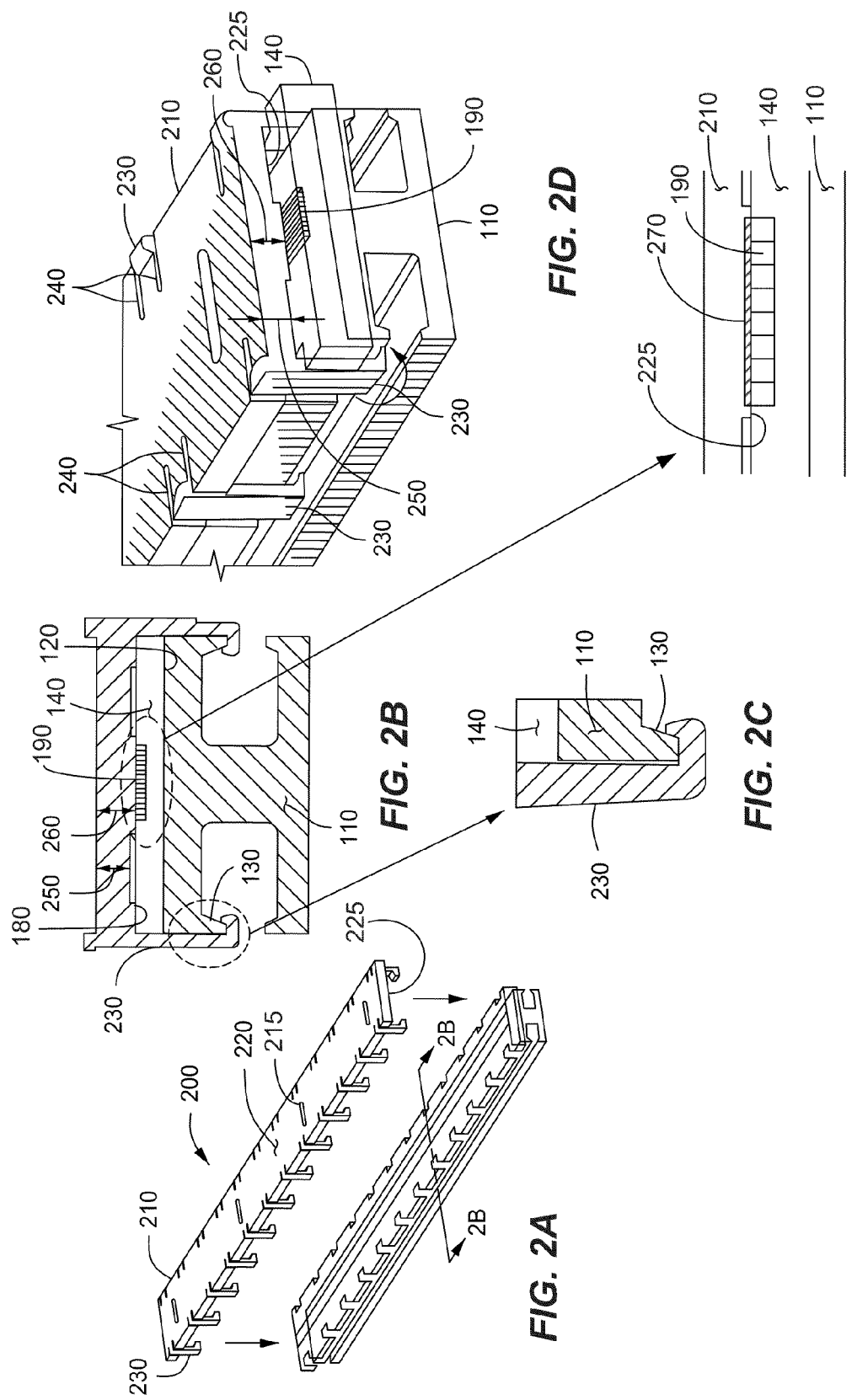

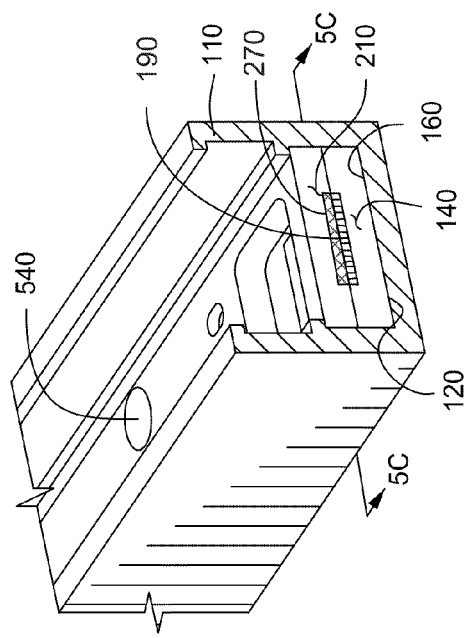
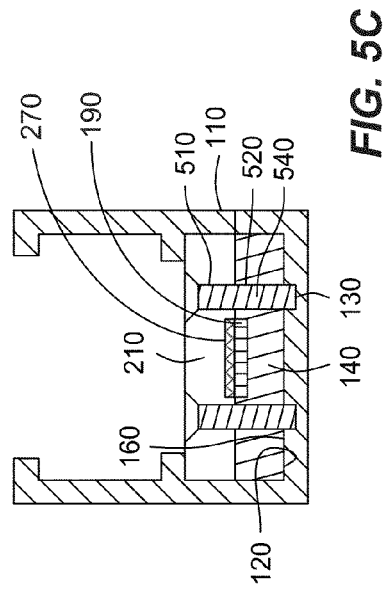
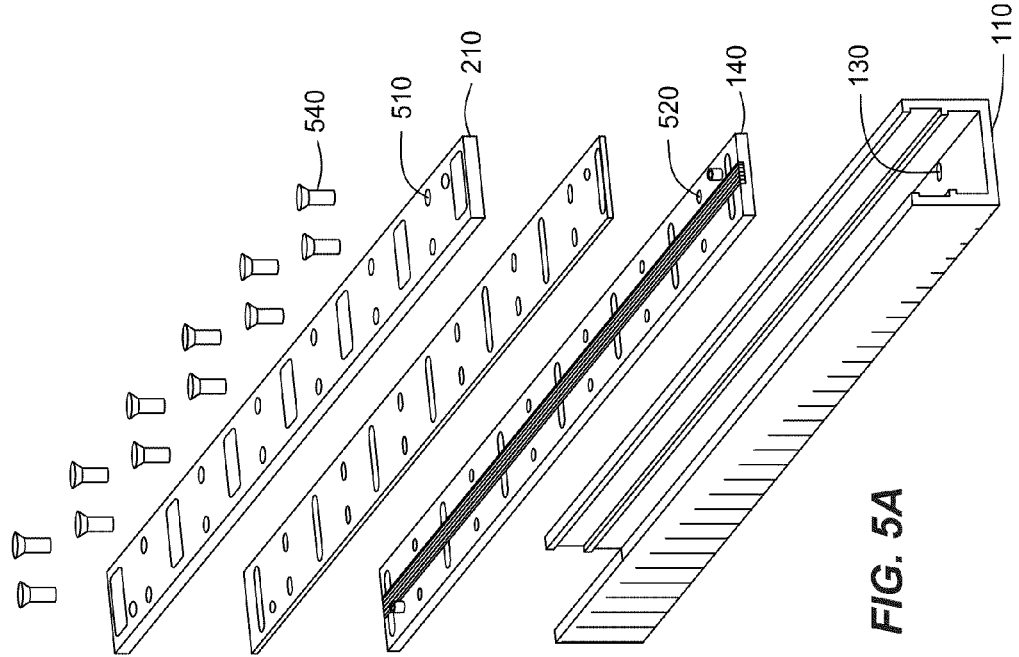

WAVEGUIDE SYSTEMS AND METHODS

CROSS-REFERENCE TO RELATED APPLICATIONS

This application is related to co-pending U.S. patent application Ser. No. 12/263,384, filed 31 Oct. 2008, and entitled "System and Method for an In-Plane Hollow core waveguide Optical Power Beam Splitter"; co-pending International Application No. PCT/US2009/030666, filed 9 Jan. 2009, and entitled "Systems and Methods for Routing Optical Signals"; co-pending International Application No. PCT/US2008/082143, filed 31 Oct. 2008, and entitled "Device for Optically Coupling Photonic Elements"; co-pending International Application No. PCT/US2008/012351, filed 31 Oct. 2008, and entitled "Optical Broadcast Busses with Shared Optical Interfaces"; co-pending International Application No. PCT/US2008/063283, filed 9 May 2008, and entitled "Methods for Fabrication of Large Core Hollow core waveguides"; and co-pending International Application No. PCT/US2008/058769, filed 28 Mar. 2008, and entitled "Flexible Optical Interconnect," all of which are incorporated by reference, as though reproduced in their entirety, into this application.

BACKGROUND

The use of optical signals, i.e. signals in whole or in part within the optical electromagnetic spectrum, continues to grow due to the increased bandwidth and flexibility such signals offer over traditional electrical signals. As optical signals increase their penetration and market share in communications applications formerly dominated by electrical signal transmission, the ability to transmit wide bandwidth optical signals in becomes critical to meeting the demands placed upon modern optics-based communication systems. While hollow-metal waveguides (HMWG) offer benefits for transmitting optical signals over short distances, their construction, application, and installation must often meet demanding requirements to ensure the integrity of the data transmitted along the waveguide.

BRIEF DESCRIPTION OF THE DRAWINGS

Advantages of one or more disclosed embodiments may become apparent upon reading the following detailed description and upon reference to the drawings in which:

FIG. 2A is an upper perspective view depicting one example of a disassembled waveguide apparatus, according to one or more embodiments described herein;

FIG. 2B is a sectional view depicting one example of the assembled waveguide apparatus depicted in FIG. 2A, along sectional line 2B-2B, according to one or more embodiments described herein;

FIG. 2C is an enlarged detail view depicting one example of the assembled waveguide apparatus depicted in FIG. 2B, according to one or more embodiments described herein;

FIG. 2D is an enlarged upper perspective view depicting one example of the assembled waveguide apparatus depicted in FIG. 2A, according to one or more embodiments described herein;

FIG. 2E is an enlarged detail view depicting one example of the assembled waveguide apparatus depicted in FIG. 2B, according to one or more embodiments described herein;

FIG. 5A is an upper perspective view depicting another example of a disassembled waveguide apparatus, according to one or more embodiments described herein;

FIG. 5B Is an upper perspective view depicting an example of the assembled waveguide apparatus depicted in FIG. 5A, according to one or more embodiments described herein; and FIG. 5C is sectional view depicting an illustrative cross section of the assembled waveguide apparatus depicted in FIG. 5B, along line 5C-5C, according to one or more embodiments described herein.

DETAILED DESCRIPTION

Figures 1A, 1B, 1C:
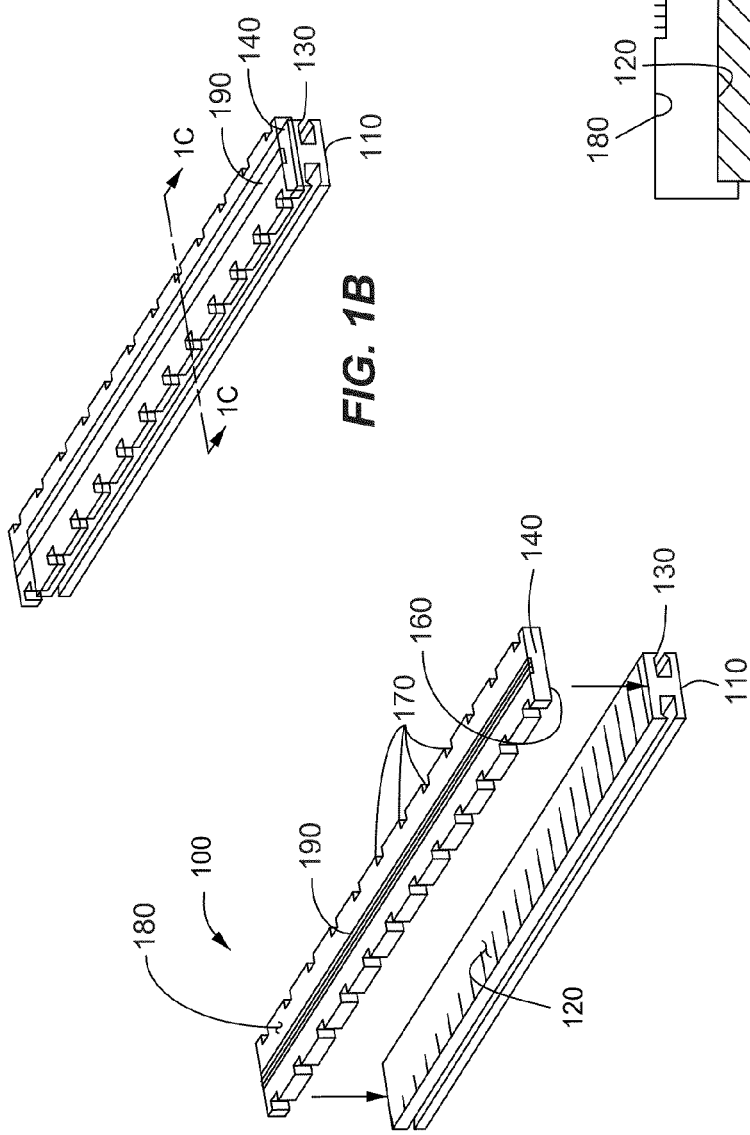
FIG. 1A is an upper perspective view depicting one example of a disassembled waveguide apparatus, according to one or more embodiments described herein.
FIG. 1B is an upper perspective view depicting one example of the assembled waveguide apparatus depicted in FIG. 1A, according to one or more embodiments described herein.
FIG. 1C is a sectional view depicting one example of the assembled waveguide apparatus depicted in FIG. 1B, along sectional line 1C-1C, according to one or more embodiments described herein.

A waveguide apparatus for the transmission of one or more optical signals is provided. The waveguide apparatus can include a base member comprising a first surface and at least one first attachment feature. The apparatus can further include a waveguide member comprising a first surface and a second surface. The waveguide member first surface can be complimentary to and disposed proximate the base first surface. The waveguide member second surface can comprise at least one channel. The apparatus can further include a cover member comprising a plurality of second attachment features adapted to engage at least a portion of one or more first attachment features. The cover member can be disposed proximate at least a portion of the waveguide member second surface proximate the at least one channel to provide at least one hollow core waveguide.

As used herein, the term "hollow core waveguide" can include any hollow waveguide member having a diameter, width, or height on the order of 50 to 150 or more times the wavelength of the optical signal the waveguide is configured to guide. The waveguide can have a cross-sectional shape that is square, rectangular, round, elliptical, or any other shape suitable for guiding an optical signal. The waveguide can be formed from any material, including metallic materials, non-metallic materials, and composites comprising metallic and non-metallic materials.

A reflective coating can be disposed partially or completely across the interior portions of the waveguide. The reflective coating can comprise one or more layers of metal, dielectrics, or other materials that are at least partially reflective at the wavelength of the optical signal transmitted through the waveguide. In some embodiments, the reflective layer may be formed using a metallic material such as silver, gold, aluminum, or alloys thereof to form the highly reflective layer. Alternatively, the reflective layer may be a dielectric stack which can be formed from one or more layers of dielectric material that is at least partially reflective at a selected wavelength, for example one or more wavelengths comprising the optical signal transmitted within the waveguide.

A method for the transmission of at least one optical signal using a waveguide apparatus is also provided. In at least one embodiment, the method can include trapping at least a portion of a waveguide member between a base member and a cover member. The base member can include a first surface and at least one first attachment feature. The waveguide member can include a first surface complimentary to, and disposed proximate, the base member first surface. The waveguide member can include a second surface comprising at least one channel. The cover member can include a plurality of second attachment features adapted to engage the at least one first attachment feature. At least a portion of the cover member can be disposed proximate the at least one channel, to provide at least one hollow core waveguide.

A system for the transmission of at least one optical signal using a waveguide apparatus is also provided. In at least one embodiment, the system can include an enclosure having an interior surface and an exterior surface; an optical signal transmitter disposed at least partially within the enclosure; an optical signal receiver disposed at least partially within the enclosure; and a waveguide apparatus disposed at least partially within the enclosure. The waveguide apparatus can include a base member having a first surface and at least one first attachment feature, a waveguide member having a first surface and a second surface, and a cover member having a plurality of second attachment features. All or a portion of the waveguide member first surface can be complimentary to and disposed proximate all or a portion of the base member first surface. The waveguide member second surface can comprise at least one channel. The cover member can be disposed proximate at least a portion of the waveguide member. Each of the second attachment features can adapted to engage all or a portion of the at least one first attachment features, thereby trapping or otherwise sandwiching the waveguide member between the cover member and the base member. At least a portion of the cover member can be disposed proximate the at least one channel, to provide at least one hollow core waveguide. The system can also include at least one connector having a lens array configured to direct at least one optical signal from the optical signal transmitter to the waveguide member. The system can additionally include at least one connector having a lens array configured to direct at least one optical signal from the waveguide member to the optical signal receiver.

For clarity and ease of discussion, FIGS. 1A-1C will be discussed in detail as a group. FIG. 1A is an upper perspective view depicting one example of a disassembled waveguide apparatus 100, according to one or more embodiments. FIG. 1B is an upper perspective view depicting one example of the assembled waveguide apparatus 100 depicted in FIG. 1A, according to one or more embodiments. FIG. 1C is a sectional view depicting one example of the assembled waveguide apparatus 100 depicted in FIG. 1B, along sectional line 1C-1C, according to one or more embodiments. In one or more embodiments, the waveguide apparatus 100 can include a base member 110 having a first surface 120, and a waveguide member 140 having a first surface 160 and a second surface 180. In at least one embodiment, all or a portion of the waveguide member first surface 160 can be disposed proximate all or a portion of the base member first surface 120. In some embodiments, at least one channel 190 can be disposed in, on, or about all or a portion of the waveguide member second surface 180.

The base member 110 can include a rigid member having any size, shape, or physical configuration. In some embodiments, the base member 110 can be a solid, rigid member. In some embodiments, the base member 110 can be a structurally shaped member, including without limitation, the "I-beam" structural shape depicted in FIGS. 1A-1C. Other structural shapes can be employed as the base member 110 with similar efficiency and effect. The base member 110 can be fabricated using any known or to be developed technology suitable for fabricating a rigid member having the desired physical parameters such as size, shape, and length.

In at least one embodiment, the base member 110 can be an extruded metal shape, for example an extruded aluminum member having an "I-beam" or similar structural shape as depicted in FIGS. 1A-1C. In other embodiments, the base member 110 can be an injection molded or extruded polymer or thermoplastic member having either a solid or structural shape. In yet other embodiments, the base member 110 can be a composite member, for example a laminated extruded metallic core (e.g., an aluminum core member, and the like) partially or completely encapsulated using a different material (e.g., one or more polymers, one or more thermoplastics, carbon fiber, and the like). In some embodiments, the base member 110 can be a composite member, for example an extruded metallic core laminated in whole or in part with a non-conductive material. In some embodiments, the base member 110 can be a composite member, for example an extruded metallic core laminated, in whole or in part, with a material having predetermined reflective characteristics.

As used herein, the term "polymer" can refer to any large molecule or macromolecule composed of one or more repeating structural units or compounds. Polymers can be formed by combining many small molecules known as monomers into a covalently bonded polymer chain. In some embodiments, all or a portion of the repeating structural units or compounds can be connected via covalent bonds.

The base member 110 can have a first surface 120 disposed on at least a portion of the base member 110, for example, the first surface 120 can include all or a portion of the upper surface of the base member 110 as depicted in FIGS. 1A-1C. In some embodiments, the first surface 120 can be a substantially planar surface extending across the base member 110. In some embodiments, one or more surface features can be disposed in, on, or about the base member first surface 120, for example one or more ridges (raised surface features), one or more channels (recessed surface features), or any combination thereof, can be disposed in, on, or about all or a portion of the base member first surface 120.

The terms "upper," "lower," and other like terms used herein refer to relative positions to another and are not intended, nor should be interpreted, to denote a particular absolute direction or spatial orientation. For example, a feature described as being on a "lower" surface of a member could be on the "upper" surface or a "side" surface of the member if the member is rotated or inverted; such rotation or inversion is envisioned to be within the scope of one or more claimed embodiments described herein.

One or more first attachment features 130 can be disposed in, on, or about the base member 110. In some embodiments, the one or more first attachment features 130 can include, but are not limited to, one or more flanges, lips, tabs, or the like disposed in whole or in part proximate the base member first surface 120. In the sample embodiment depicted in FIGS. 1A-1C, the one or more first attachment features 130 can include an extended flange disposed about at least a portion of the base member 130, proximate the base member first surface 120. As will be discussed in greater detail with regards to FIGS. 6A-6D, the one or more first attachment features can also include one or more apertures, holes, voids, channels, recesses, or the like disposed in, on, or about the base member 110.

The waveguide member 140 can include any member suitable for the transmission or propagation of one or more electromagnetic signals in the optical spectrum. The waveguide member 140 can have any size, shape, or physical configuration suitable for the transmission or propagation of one or more electromagnetic signals disposed partially or completely within the optical spectrum. The waveguide member 140 can include, but is not limited to a planar waveguide member, a strip waveguide member, a fiber waveguide member, or any combination thereof.

In some embodiments, the waveguide member 140 can be an injection molded plastic, thermoplastic, or polymeric member. In some embodiments, the waveguide member 140 can be a glass member. In some embodiments, at least one optical channel can be disposed in, on, or about the waveguide member 140. In some embodiments, one or more features permitting the positioning of optical cables can be disposed in, on, or about the waveguide member 140. One or more features for directing optical signals into or out of the waveguide member 140 can be disposed in, on, or about the waveguide member 140, these features can include, but are not limited to, one or more optical fibers, one or more photodetectors, or the like. In some embodiments, a positioning lens or lens array can be disposed in, on, or, about the waveguide member 140.

A first surface 160 can be disposed on all or a portion of the waveguide member 140. In some embodiments, the waveguide member first surface 160 can include all or a portion of the lower surface of the waveguide member 140 as depicted in FIGS. 1A-1C. All or a portion of the waveguide member first surface 160 can be disposed proximate the base member 110. The waveguide member first surface 160 can be suitable for disposal proximate the base member first surface 120. In some embodiments, the waveguide member first surface 160 can be substantially planar, corresponding to the substantially planar base member first surface 120. In some embodiments, one or more raised or recessed surface features can be disposed in, on, or about the waveguide member first surface 160, with all or a portion of the raised or recessed features corresponding to complimentary raised or recessed features disposed in, on, or about the base member first surface 120. In some embodiments, a plurality of recesses, channels, gaps, voids, or the like, (hereinafter referred to collectively as "recesses" without limitation) 170 can be disposed in, on, or about the waveguide member 140, for example about the perimeter of the waveguide member 140 as depicted in FIGS. 1A-1C.

pox A second surface 180 can be disposed on all or a portion of the waveguide member 140. In some embodiments, at least one channel 190 can be disposed in whole or in part across the waveguide member second surface 180. In some embodiments, the channel 190 can be a three-sided open topped feature recessed in whole or in part into the waveguide second surface 180 as depicted in FIGS. 1A-1C. In some embodiments, the at least one channel 190 can include three equal length sides. In some embodiments, the at least one channel 190 can include two equal length sides and a bottom side having a different length. In some embodiments, the bottom length of the channel 190 can be less than the equal length sides. In some embodiments, the bottom length of the channel 190 can be greater than the equal length sides.

In some embodiments, the waveguide member second surface 180 and the at least one channel 190 can be disposed on the upper surface of the waveguide member 140 as depicted in FIGS. 1A-1C. In at least some embodiments, all or a portion of the at least one channel 190 can be a three-sided, open topped, metalized channel that can be transformed into at least one hollow core waveguide by disposing a cover member proximate all or a portion of the at least one channel 190.

For clarity and ease of discussion, FIGS. 2A-2D will be described in detail as a group. FIG. 2A is an upper perspective view depicting one example of a disassembled waveguide apparatus 200, according to one or more embodiments. FIG. 2B is a sectional view depicting one example of the assembled waveguide apparatus 200 depicted in FIG. 2A, along sectional line 2B-2B, according to one or more embodiments. FIG. 2C is an enlarged detail view depicting one example of the assembled waveguide apparatus 200 depicted in FIG. 2B, according to one or more embodiments. FIG. 2D is an enlarged upper perspective view depicting one example of the assembled waveguide apparatus 200 depicted in FIG. 2A, according to one or more embodiments. FIG. 2E is an enlarged detail view depicting one example of the assembled waveguide apparatus 200 depicted in FIG. 2B, according to one or more embodiments.

The system 200 can include a cover member 210. In some embodiments, the cover member 210 can include a surface 220 disposed distal from the waveguide member 140, for example a surface forming all or a portion of the upper surface of the cover member 210. In some embodiments, the cover member 210 can include another surface 225 disposed proximate the waveguide member 140, for example a surface forming all or a portion of the lower surface of the cover member 210. One or more second attachment features 230 can be disposed in, on, or about the cover member 210. In some embodiments, the recesses 170 formed in all or a portion of the perimtere of the waveguide member 140 can accommodate the passage of all or a portion of the second attachment features 230 therethrough.

The cover member 210 can include any rigid or semi-rigid member having any size, shape, or physical configuration. The cover member 110 can be fabricated using any known or to be developed technology suitable for fabricating a rigid or semi-rigid member having the desired physical parameters such as size, shape, and length.

In at least one embodiment, the cover member 210 can be an extruded, injection molded, or cast metal, plastic, thermoplastic, or polymer shape, for example a cast plastic member having a plurality of second attachment features 230 disposed thereabout as depicted in FIGS. 2A-2D. In other embodiments, the cover member 210 can be a composite member, for example a laminated extruded metallic core (e.g., an aluminum core member, and the like) partially or completely encapsulated using a different material (e.g., one or more polymers, one or more thermoplastics, carbon fiber, and the like). In some embodiments, the cover member 210 can be a composite member, for example an extruded metallic core laminated in whole or in part with a non-conductive material. In some embodiments, the cover member 210 can be a composite member, for example an extruded metallic core laminated, in whole or in part, with a material having predetermined reflective characteristics.

In some embodiments, the cover member 210 can be of a single, uniform thickness. In other embodiments, the cover member 210 can be of non-uniform thickness. For example, the cover member can have two or more thicknesses as depicted in FIG. 2B. Such an arrangement may be useful when pressure cannot be distributed evenly across the waveguide member 140 causing gaps between the cover member 210, the at least one channel 190, and the waveguide member 140.

In some embodiments, the surface 225 disposed proximate the waveguide member 140 can be a non-planar structure, for example the surface 225 can be "stepped," i.e. having two or more levels. In some embodiments, the cover member 210 can have a first thickness 250 that is less than a second thickness 260. In such an embodiment, all or a portion of the cover member 210 having the second thickness 260 can be in contact with the waveguide member 140 or all or a portion of the channels 190 disposed thereupon, while all or a portion of the cover member 210 having the first thickness 250 can be out of contact with the waveguide member 140. In some embodiments, one or more raised or recessed features can be disposed in, on, or about the waveguide member second surface 180. In this manner, a cover member 210 having non-uniform thickness can maintain contact across all or a portion of the waveguide member second surface 180.

In at least some embodiments, all or a portion of the cover member 210 can be disposed proximate at least a portion of the channel 190 as depicted in FIGS. 2B-2D. In at least some embodiments, a reflective coating 270 can be disposed on or about all or a portion of the cover member surface 225 disposed proximate the waveguide member second surface 180, the channel 190, or both the waveguide member second surface 180 and the channel 190. In some instances, the reflective coating can be disposed on the cover member surface 225 disposed proximate the channel 190, to provide a four sided, closed, reflective, channel or conduit, e.g., a hollow core waveguide.

The reflective coating 270 can inclouде one or more layers of metal, dielectrics, or other materials that are substantially reflective at the wavelength of the optical signal transmitted within the channel 190. In some embodiments, the reflective layer 270 can be formed using silver, gold, aluminum, or some other metal or alloy. In some embodiments, the reflective layer 270 can be a dielectric stack which can be formed from one or more layers of dielectric material that is substantially reflective at a selected wavelength, for example one or more wavelengths comprising the coherent light signal transmitted within the hollow core waveguide.

In at least some embodiments, at least one aperture 215 can be disposed in, on, or about the cover member 210. In some embodiments, all or a portion of the at least one aperture 215 can permit the insertion of one or more optical signals into the channel 190 disposed on the waveguide member second surface 180. In some embodiments, all or a portion of the at least one aperture 215 can permit the removal of one or more optical signals from the channel 190 disposed on the waveguide member second surface 180.

The one or more second attachment features 230 can include any device, system, or any combination of systems and devices suitable for attaching the cover member 210 to the base member 110 either alone or in conjunction with the use of one or more fasteners. In some embodiments, each of the one or more attachment features 230 can include a tab extending from the cover member 210. In some embodiments, at least a portion of the one or more second attachment features 230 can pass partially or wholly through the plurality of recesses 170 disposed in, on, or about the waveguide member 140, prior to engaging the first attachment feature 130. In some embodiments, the one or more second attachment features 230 can be sufficiently flexible to permit the detachable attachment of the one or more second attachment features 230 to at least a portion of the one or more first attachment features 130. In some embodiments, one or more slots 240 can be disposed proximate the one or more second attachment features 230 to improve the flexibility of the one or more second attachment features 230.

In some embodiments, as depicted in FIGS. 2A-2D, at least a portion of the second attachment features 230 can include a plurality of flexible latches adapted to detachably engage the first attachment feature 130 disposed about the base member 110. In some embodiments, as depicted in FIGS. 2A-2D, at least two parallel slots 240 can be disposed proximate each of the one or more second attachment features 230. The disposal of at least two parallel slots 240 proximate at least a portion of the second attachment features 230 can increase the flexibility of the second attachment features 230, thereby permitting the one or more second attachment features 230 to "snap" onto the one or more first attachment features 130. For example, the one or more second attachment features 230 can be "J and the one or more first attachment features 130 can be "L"-shaped as depicted in FIG. 2C. using such an arrangement, that the lower, "hook" portion of the "J"-shaped second attachment feature 230 can detachably engage the short "leg" portion of the "L"-shaped first attachment feature 130.

The cover member 210 can be of a single thickness or be of multiple thicknesses. For example, in some embodiments, the cover member 210 can be of a first thickness 250 between the two parallel slots proximate each of the one or more second attachment features 230 and be of a second thickness 260 distal from each of the one or more second attachment features. The first thickness 250 can be the same as, less than, or greater than the second thickness 260. In some embodiments, the first thickness 250 and the second thickness 260 of the cover member 210 can correspond to one or more features disposed in, on, or about all or a portion of the waveguide member surface 180 disposed proximate the cover member surface 225.

In other embodiments, the one or more second attachment features 230 can include one or more apertures, and the one or more first attachment features 130 can include one or more complimentary apertures to permit the detachable attachment of the cover member 210 to the base member 110 using one or more fasteners. Such embodiments are discussed in greater detail with respect to FIGS. 5A-5D.

Figure 3:
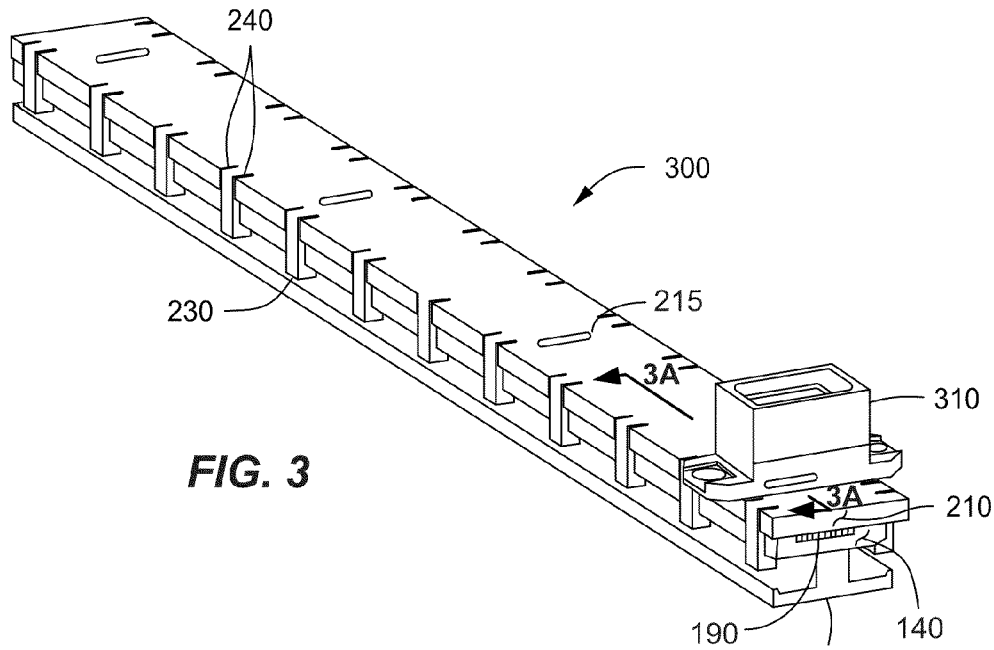
FIG. 3 is an upper perspective view depicting one example of an assembled waveguide system, according to one or more embodiments described herein.
Figure 3A:
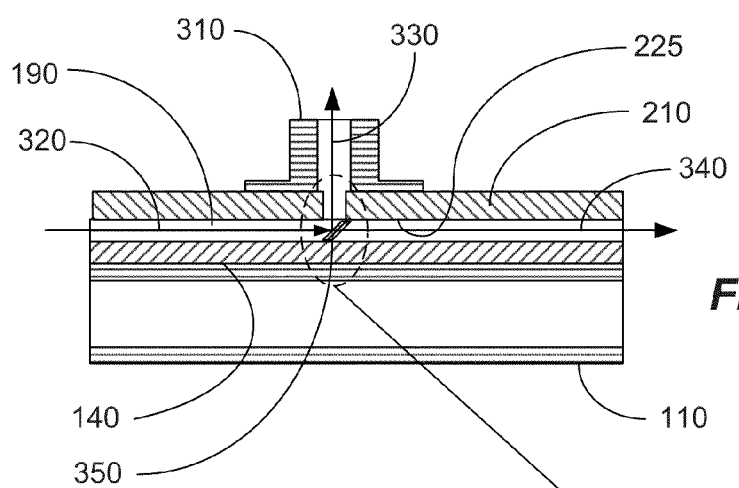
FIG. 3A is a partial sectional view of the assembled waveguide apparatus depicted in FIG. 3, along line 3A-3A, according to one or more embodiments described herein.
Figure 3B:
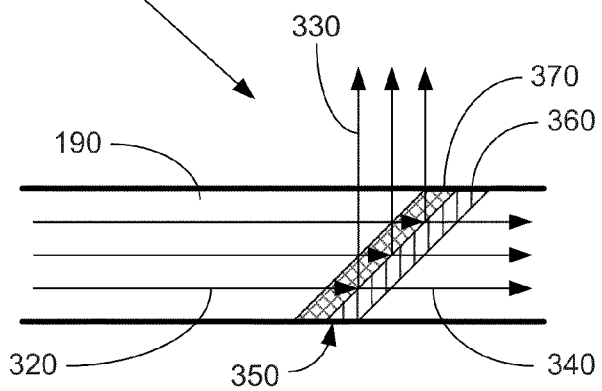
FIG. 3B is an enlarged detail view depicting one example of the assembled waveguide apparatus depicted in FIG. 3A, according to one or more embodiments described herein.

FIG. 3 is an upper perspective view depicting one example of an assembled waveguide system 300, according to one or more embodiments. FIG. 3A is a partial sectional view of the assembled waveguide apparatus depicted in FIG. 3, along line 3A-3A, according to one or more embodiments. FIG. 3B is an enlarged detail view depicting one example of the assembled waveguide apparatus depicted in FIG. 3A, according to one or more embodiments. In some embodiments, the system 300 can include one or more waveguide member 140 compressed, sandwiched, or otherwise trapped between one or more cover members 210 detachably attached to one or more base members 110. As depicted in FIG. 3, in some embodiments, the one or more second attachment features 230 can pass through at least a portion of the recesses 170 disposed about the waveguide member 140 prior to detachably attaching to the first attachment feature 130. In some embodiments, at least one guide pin can be disposed on or about the cover member 210 to aid in the alignment of the optical connectors to the channels 190 disposed on the on the waveguide member second surface 180.

In one or more embodiments, one or more optical connectors 310 can be disposed proximate the cover member 210. In at least some embodiments, the one or more optical connectors 310 can be disposed proximate the one or more cover member apertures 215, thereby facilitating the insertion or removal of one or more optical signals to the channel 190 disposed on the waveguide member second surface 180.

In some embodiments, the one or more optical connectors 310 can include at least one lens or optical element adapted to direct all or a portion of the optical signal from the exterior of the waveguide member to the channel 190. In some embodiments, the one or more optical connectors 310 can include a collimator configured to collimate a multi-mode optical signal emitted, for example by a laser source, thereby forming a collimated beam in which the multiple modes travel substantially in parallel. In some embodiments, the one or more optical connectors 310 can include a grating coupler or a prism coupler adapted to couple at least one optical signal into the channel 190.

In some embodiments, an optical element 350 can be disposed at least partially within the hollow core waveguide as depicted in FIGS. 3A-3B. In some embodiments, the optical element 350 can include one or more beamsplitters or semi-transparent mirrors, or similar element adapted to both reflect 330 and transmit 340 a portion of an incident optical signal 320. In some embodiments, the optical element 350 can include a mirror or similar element adapted to reflect 330 and transmit 340 a portion of an incident optical signal 320. In some embodiments, all or a portion of the reflected optical signal 330 can be removed from the waveguide system 300 using one or more connectors 310. In a similar manner, although not shown in FIG. 3A-3B, an optical signal can be introduced to the optical element 350 via one or more connectors 310, thereby introducing the reflected portion of the optical signal into the channel 190.

In some embodiments, the optical element 350 can include a coated mirror, for example, as depicted in FIG. 3B. The optical element 350 can have any size, shape or configuration, and although depicted as a planar structure in FIG. 3B, other shapes such as parabolic, hyperbolic and spherical are also possible. In some embodiments, the optical element 350 can include a mirror constructed of polished metal or stacked dielectric materials 360, 370. In some embodiments, the optical elements 350 can include a similar or identical reflective coating as used in the channel 190.

Figure 4:
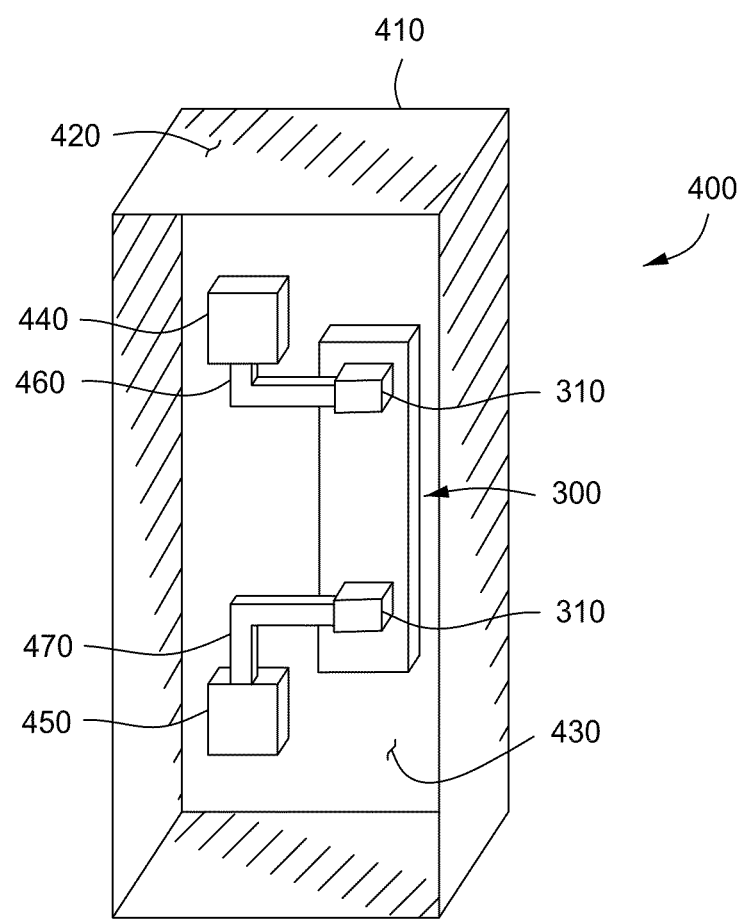
FIG. 4 is a perspective view depicting one example of an assembled waveguide system disposed within an exemplary electronic enclosure, according to one or more embodiments described herein.

FIG. 4 is a perspective view depicting one example of an assembled system 400 comprising a waveguide system 300 disposed within an exemplary electronic enclosure 410, according to one or more embodiments. The enclosure 410 can define a partially or completely enclosed equipment space, having one or more exterior surfaces 420 and one or more interior surfaces 430. At least one optical signal transmitter 440 can be communicatively coupled to the waveguide system 300 via one or more optical conduits 460 and one or more optical connectors 310. In some embodiments, the optical conduits 460 may be comprised of parallel multimode fiber ribbons or multimode waveguides. Similarly, at least one optical signal receiver 450 can be communicatively coupled to the waveguide system 300 via one or more optical conduits 470 and one or more optical connectors 310.

As used herein, a "communicative coupling", or a connection by which entities are "communicatively coupled," is one in which signals, physical communications, and logical communications may be transmitted or received. A communicative coupling can include a physical interface, an electrical interface, or a data interface, but it is to be noted that a communicative coupling may include differing combinations of these or other types of connections sufficient to allow intermittent or continuous communication or control. For example, two entities can be communicatively coupled by being able to communicate signals to each other directly or through one or more intermediate entities like a processor, operating system, a logic device, software, optical conduit, transmission line, or other entity. Logical and physical communication channels can also be used to form a communicative coupling.

The optical signal generator or transmitter 440 can be disposed, in whole or in part, within the enclosure 410. In some embodiments, the optical signal transmitter 440 can be permanently or detachably attached to at least a portion of the interior surface 430 of the enclosure 410.

In at least one embodiment, the optical signal transmitter 440 can include at least one device, system, or any combination thereof, adapted to transform all or a portion of at least one electrical signal into an optical signal, i.e. a signal at least partially within the optical electromagnetic spectrum. The optical signal generated by the optical signal transmitter 440 can be transferred or otherwise communicated in whole or in part to the waveguide system 300 using at least one optical conduit 460 and at least one connector 310. The at least one optical conduit 460 and at least one connector 310 can, in turn, transmit or otherwise transfer at least a portion of the optical signal provided by the optical signal transmitter to the waveguide member 140 disposed within the waveguide system 300.

The optical signal receiver 450 can be disposed, in whole or in part, within the enclosure 410. In some embodiments, the optical signal receiver 450 can be permanently or detachably attached to at least a portion of the interior surface 430 of the enclosure 410.

In at least one embodiment, the optical signal receiver 450 can include at least one device, system, or any combination thereof, adapted to transform all or a portion of at least one optical signal, i.e. a signal at least partially within the optical electromagnetic spectrum into at least one electrical signal. At least a portion of the optical signal transmitted or otherwise conveyed by the waveguide system 300 can be transferred or otherwise communicated in whole or in part to the optical signal receiver 450 using at least one optical conduit 470 and at least one connector 310.

For clarity and ease of discussion, FIGS. 5A-5C will be discussed in detail as a group. FIG. 5A is an upper perspective view depicting another example of another disassembled waveguide apparatus 500, according to one or more embodiments. FIG. 5B is an upper perspective view depicting an example of the assembled waveguide apparatus depicted in FIG. 5A, according to one or more embodiments. FIG. 5C is sectional view depicting an illustrative cross section of the assembled waveguide apparatus depicted in FIG. 5B, along line 5C-5C, according to one or more embodiments. In some embodiments, the base member 110 can be a channel shaped member having the first surface 120 disposed on or about all or a portion of the interior surface of the web portion of the channel member as depicted in FIGS. 5A-5C.

In some embodiments, all or a portion of the one or more second attachment features 230 can include, but are not limited to, one or more apertures 510. In some embodiments, all or a portion of the apertures 510 can traverse the cover member 210, forming passages therethrough. In some embodiments, coarse or fine female threads can be disposed within all or a portion of the apertures 510, for example to facilitate the passage or installation of one or more threaded fasteners 540. In some embodiments, the interior surface of all or a portion of the apertures 510 can be smooth for example to facilitate the installation of one or more non-threaded fasteners 540, for example one or more rivets.

In some embodiments, one or more apertures 520 can be disposed in, on, or about the waveguide member 140. In some embodiments, all or a portion of the apertures 520 can traverse the waveguide member 140, forming a passage therethrough. In some embodiments, coarse or fine female threads can be disposed within all or a portion of the apertures 520, for example to facilitate the passage or installation of one or more threaded fasteners 540. In some embodiments, the interior surface of all or a portion of the apertures 520 can be smooth for example to facilitate the installation of one or more non-threaded fasteners 540, for example one or more rivets.

In some embodiments, one or more apertures 530 can be disposed in, on, or about the base member first surface 120. In some embodiments, all or a portion of the apertures 530 can traverse the base member 110, forming a passage therethrough. In some embodiments, all or a portion of the apertures 530 can partially, or incompletely, traverse the base member 110, forming a recess therein. In some embodiments, coarse or fine female threads can be disposed within all or a portion of the apertures 530, for example to facilitate the passage or installation of one or more threaded fasteners 540. In some embodiments, the interior surface of all or a portion of the apertures 530 can be smooth for example to facilitate the installation of one or more non-threaded fasteners 540, for example one or more rivets.

In some embodiments, the one or more apertures 510 disposed in, on, or about the cover member 210, the one or more apertures 520 can be disposed in, on, or about the waveguide member 140, and the one or more apertures 530 disposed in, on, or about the base member 110 can be substantially aligned to permit at least partial passage of one or more fasteners 540, as depicted in FIG. 5C. Such an arrangement can facilitate the permanent or detachable attachment of the cover member 210 to the base member 110 using one or more fasteners 540. In some embodiments, female threads can be disposed within all or a portion of the one or more apertures 510, 520, and 530, for example to facilitate the installation of one or more threaded fasteners. In some embodiments, the interior surface of all or a portion of the one or more apertures 510, 520, and 530 can be smooth for example to facilitate the installation of one or more fasteners, for example one or more rivets.

The one or more fasteners 540 can include any device, system, or combination of systems and devices suitable for the permanent or detachable attachment of the cover member 210 to the base member 110. In some embodiments, at least a portion of the fasteners 540 can have male threads disposed thereabout and at least a portion of the apertures 510, 520, and 530 can have complimentary female threads disposed at least partially therein. At least a portion of the fasteners 530 can include threaded fasteners, for example cap screws, hex cap screws, hex bolts, socket cap screws, machine screws, self-tapping machine screws, set screws, or similar.

While the foregoing is directed to embodiments of the present invention, other and further embodiments of the invention may be devised without departing from the basic scope thereof, and the scope thereof is determined by the claims that follow.

What is claimed is:

1. A waveguide apparatus, comprising:
   a base member comprising a first surface and at least one first attachment feature;
   a waveguide member comprising a first surface complimentary to and proximate the base member first surface and a second surface;
       wherein at least a portion of the second surface comprises at least one channel; and
   a cover member, comprising a plurality of second attachment features adapted to attach to at least a portion of the plurality of first attachment features, disposed proximate at least a portion of the waveguide member;
       wherein at least a portion of the cover member surface is disposed proximate the at least one channel, to provide at least one hollow core waveguide;
   wherein the at least one first attachment feature comprises an extended flange disposed about at least a portion of the first surface of the base member; and
       wherein the plurality of second attachment features comprise a plurality of flexible latches adapted to detachably engage the extended flange;
   wherein two parallel slots are disposed proximate each of the flexible latches;
   wherein the cover member comprises a first thickness between the two parallel slots proximate each of the flexible latches;
   wherein the cover member comprises a second thickness distal from each of the flexible latches; and
   wherein the first thickness is less than the second thickness.

2. The apparatus of claim 1, wherein the waveguide member first surface comprises a recessed feature configured to accommodate at least a portion of the base member first surface.

3. The apparatus of claim 1, wherein a reflective coating is disposed in at least a portion of the at least one channel, and wherein a reflective coating is disposed on the portion of the cover member surface proximate the at least one channel.

4. The apparatus of claim 3, wherein the reflective coating comprises at least one layer of metal.

5. The apparatus of claim 3, wherein the reflective coating comprises at least one dielectric layer.

6. The apparatus of claim 1, wherein the cover traps the waveguide member against the base when the plurality of second attachment features detachably engage all or a portion of the first attachment feature.

7. A waveguide method, comprising:
   trapping a waveguide member between a base member and a cover member;
       wherein the base member comprises a first surface and at least one first attachment feature;
       wherein the waveguide member comprises a first surface complimentary to, and disposed proximate, the base member first surface; and a second surface comprising at least one channel;
       wherein the cover member comprises a plurality of second attachment features adapted to engage at least a portion of the at least one first attachment feature, disposed proximate at least a portion of the waveguide; wherein at least a portion of the cover member is disposed proximate the at least one channel to provide at least one hollow core waveguide;
       wherein the at least one first attachment feature comprises a plurality of female threaded apertures;
       wherein a plurality of apertures are disposed about the waveguide member;
       wherein the plurality of second attachment features comprise a plurality of apertures; and
       wherein trapping the waveguide member between the cover member and the base member comprises:
           passing at least a portion of at least one threaded fastener through at least a portion of the plurality of second attachment features;
           passing at least a portion of at least one threaded fastener through at least a portion of the plurality of waveguide member apertures; and
           threadedly engaging at least a portion of the fastener with at least a portion of the at least one first attachment features.

8. The system of claim 7, further comprising a reflective coating disposed in at least a portion of the at least one channel, and a reflective coating disposed on the portion of the cover member proximate the at least one channel;
   wherein the reflective coating is selected from the group of coatings consisting of: at least one layer of metal, and at least one dielectric layer.

9. The method of claim 7, further comprising:
communicatively coupling at least one optical connector comprising a lens array adapted to direct at least one optical signal into the waveguide member; and
communicatively coupling at least one optical connector comprising a lens array adapted to direct at least one optical signal out of the waveguide member.

10. A waveguide system, comprising:
an enclosure comprising an interior surface and an exterior surface;
an optical signal transmitter disposed at least partially within the enclosure;
an optical signal receiver disposed at least partially within the enclosure;
a waveguide apparatus disposed at least partially within the enclosure;
   wherein the waveguide apparatus comprises:
      a base member comprising a first surface and at least one first attachment feature;
      a waveguide member comprising a first surface complimentary to, and disposed proximate, the base member first surface; and a second surface comprising at least one channel; and
      a cover member, comprising a plurality of second attachment features adapted to engage at least a portion of the at least one first attachment feature, disposed proximate at least a portion of the waveguide member;
      wherein at least a portion of the cover member is disposed proximate the at least one channel to provide at least one hollow core waveguide;
at least one optical connector comprising a lens array configured to direct at least one optical signal from the optical signal transmitter to the waveguide member;
at least one optical connector comprising a lens array configured to direct at least one optical signal from the waveguide member to the optical signal receiver; and
a plurality of threaded fasteners;
   wherein the at least one first attachment feature comprises a plurality of female threaded apertures;
   wherein a plurality of apertures are disposed about the waveguide member;
   wherein the plurality of second attachment features comprise a plurality of apertures;
   wherein the locations of at least a portion of the plurality of second attachment features correspond to the locations of at least a portion of the at least one first attachment features; and
   wherein at least a portion of the threaded fasteners are passed through at least a portion of the plurality of second attachment features, through at least a portion of the plurality of waveguide apertures and are threadedly engaged with at least a portion of the at least one first attachment features.

11. The system of claim 10, wherein the waveguide member further comprises at least one optical element disposed at least in part within all or a portion of the at least one hollow core waveguide; and
   wherein the at least one optical element is disposed proximate a cover member aperture; and
   wherein the optical element is selected from the group of elements consisting of: at least one beamsplitter, and at least one semitransparent mirror.

12. The system of claim 10, wherein the optical signal transmitter comprises at least one device adapted to transform all or a portion of an electrical signal into at least one optical signal; and
   wherein the optical signal receiver comprises at least one device adapted to transform an at least a portion of an optical signal into at least one electrical signal.

13. The system of claim 10, wherein the enclosure comprises at least one internal surface having a plurality of computing devices disposed thereupon.

14. The system of claim 10
   wherein the base member is disposed at least partially on the interior surface of the enclosure; and
   wherein the waveguide member is maintained in a position proximate the base by the detachable attachment of at least a portion of the plurality of second attachment features to at least a portion of the at least one first attachment features.

15. A waveguide apparatus, comprising:
a base member comprising a first surface and at least one first attachment feature;
a waveguide member comprising a first surface complimentary to and proximate the base member first surface and a second surface;
   wherein at least a portion of the second surface comprises at least one channel; and
a cover member, comprising a plurality of second attachment features adapted to attach to at least a portion of the plurality of first attachment features, disposed proximate at least a portion of the waveguide member;
   wherein at least a portion of the cover member surface is disposed proximate the at least one channel, to provide at least one hollow core waveguide;
   wherein the at least one first attachment feature comprises a plurality of female threaded apertures;
   wherein a plurality of apertures are disposed about the waveguide member;
   wherein the plurality of second attachment features comprise a plurality of apertures;
   wherein at least a portion of the second attachment features correspond in location to the plurality of waveguide member apertures, and the at least one first attachment features; and
   wherein at least a portion of the threaded fasteners are passed through at least a portion of the second attachment features and waveguide apertures, and are threadedly engaged with at least a portion of the at least one first attachment features.

* * * * *

UNITED STATES PATENT AND TRADEMARK OFFICE
CERTIFICATE OF CORRECTION

PATENT NO. : 8,472,761 B2
APPLICATION NO. : 12/628028
DATED : June 25, 2013
INVENTOR(S) : Paul Kessler Rosenberg et al.

It is certified that error appears in the above-identified patent and that said Letters Patent is hereby corrected as shown below:

In the Claims

In column 13, line 1, in Claim 8, delete "system" and insert -- method --, therefor.

Signed and Sealed this
Fifteenth Day of October, 2013

Teresa Stanek Rea
*Deputy Director of the United States Patent and Trademark Office*